United States Patent Office 3,008,991
Patented Nov. 14, 1961

3,008,991
PREPARATION OF α-HYDROXY-ALIPHATIC AMIDES
Howard Ensign Simmons, Jr., Wilmington, Del., assignor to E. I. du Pont de Nemours and Company, Wilmington, Del., a corporation of Delaware
No Drawing. Filed Oct. 26, 1959, Ser. No. 848,542
8 Claims. (Cl. 260—561)

This invention relates to a new process for the preparation of amides. In particular, it relates to a new process for the preparation of monomeric α-hydroxyamides.

The amides of monomeric α-hydroxyacids form a known class of compounds which may be used for the manufacture of pharmaceuticals [Wallingford, Thorpe and Stoughton, J. Am. Chem. Soc. 67, 522 (1945), U.S. Patent 1,375,949 and U.S. Patent 2,338,220]. α-Hydroxy-acid amides are also useful as softeners for regenerated cellulose (U.S. Patent 2,234,016).

Monomeric α-hydroxyamides have heretofore not been generally available by direct and easily conducted processes. For example, one of the most acceptable prior processes requires the reaction of aldehydes or ketones with highly hazardous hydrocyanic acid followed by hydrolysis which must be done under exacting conditions in order to obtain α-hydroxyamides [R. S. Stoughton, J. Am. Chem. Soc. 63, 2376 (1941); J. A. Ultee, Chem. Weekblad 38, 55 (1941) (C.A. 36, 5773)].

It has now been found that α-hydroxyamides can be prepared readily by the reaction of monomeric alcohols containing at least one secondary alcohol group with alkali metal cyanides and a halogen of atomic number 17–35, i.e., Cl or Br in an aqueous alkaline medium.

The over-all process of this invention may be illustrated but not limited in any way, by the following balanced equations wherein $R^1$ and $R^2$ may be the same or different aliphatic groups and $R^3$ may be such a group or hydrogen:

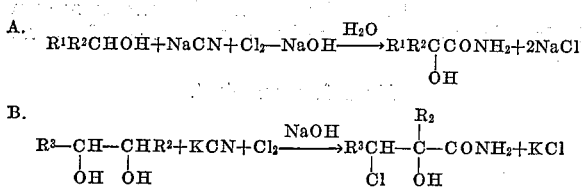

Suitable alcohols for the process of the invention include isopropanol, butanol-2, pentanol-2, pentanol-3, 4-methylpentanol-2, hexanol-2, heptanol-4, octanol-2, nonanol-3, diisobutyl carbinol, propanediol-1,2, butanediol-2,3, butanediol-1,3, glycerol, hexanetriol-1,2,6, 2-ethylhexanediol-1,3. In its preferred embodiment, the process of this invention is applied to saturated aliphatic alcohols containing at least one secondary alcohol group. Still more preferably the saturated aliphatic alcohols have the formula

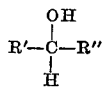

wherein R' and R" each represents saturated aliphatic hydrocarbon (alkyl) and hydroxyl substituted aliphatic hydrocarbon (hydroxyalkyl) radicals of from 1–6 carbon atoms.

In some instances, application of the process of this invention to secondary alcohols containing additional alcohol groups on carbons adjacent to the carbon bearing the secondary alcohol group give α-hydroxyamides wherein one or more of the supplementary alcohol groups has been replaced by halogen.

Any alkali metal cyanide may be used in the process of this invention. Sodium or potassium cyanides are preferred.

Alkaline reaction conditions wherein the pH is above 7 are required. The alkaline reaction medium is preferably an aqueous solution of an alkali metal hydroxyide such as sodium or potassium hydroxide. However, mixed aqueous-nonaqueous solutions of alkali metal hydroxides may be used and are intended to be encompassed in the term "aqueous."

Chlorine is the most economical and the preferred halogen for use in this invention, but bromine may be used. The choice of the halogen used will depend in some instances upon the end-product desired.

The molal ratio in which the reactants are brought together is not critical. Preferably the ratio of the secondary alcohol to alkali metal cyanide to alkali metal hydroxide is 1:1:2. Other ratios varying considerably from that indicated may be used. For instance, a large excess of the secondary alcohol may be used in which case it may also serve partly or wholly as the reaction medium. An excess of alkali metal hydroxide over that required by the amide-forming reaction is usually used in order to maintain an alkaline pH of the reaction medium. The quantity of halogen used, above and beyond that required to replace alcohol groups adjacent to the carbon bearing the secondary alcohol group is generally the amount necessary to neutralize the reaction mixture but greater or smaller proportions may be used if desired.

The reaction of the present invention is carried out preferably at −10° to +5° C., but other temperatures varying between about −25° C. and 50° C. may be used. The time of the reaction is determined in large part by the reaction conditions (i.e., efficiency of cooling, rate of agitation and rate of introducing halogen) and the size of the charge. The reaction is usually terminated when the reaction mixture becomes neutral, i.e., pH 7.

The α-hydroxyamides of this invention may be recovered by any of several suitable methods. A preferred method consists in extraction of the product from the reaction mixture with a solvent such as chloroform, followed by evaporating the solvent leaving the product as a liquid or solid residue which may be further purified by distillation or by crystallization if desired.

The process of this invention is more fully illustrated by the following examples in which parts by weight are given unless otherwise specified.

*Example 1*

A mixture of propanediol-1,2 (152 parts), potassium cyanide (130 parts), sodium hydroxide (160 parts) and water (800 parts) was stirred until the solids dissolved at 25° C. The temperature was then lowered to −5° C. by external cooling, and chlorine gas was passed into the stirred solution. The temperature was maintained at 0–5° C. until the solution had become neutral to pH paper, at which time the passage of chlorine was interrupted. The reaction required approximately seven hours. The mixture was stirred for an additional 30 minutes and was then extracted with several portions of chloroform. The chloroform extracts were dried over magnesium sulfate and the solvent removed at reduced pressure. The residue was distilled and the fraction boiling at 75–85° C. (1.2 mm.) was collected. Redistillation through a small spinning band column afforded 84 parts of β-chloro-α-methyl-α-hydroxypropionamide (also called 2-chloromethyl-2-hydroxypropionamide), B.P. 87° C. (1.0 mm.). Recrystallization of a sample of this product from hexane gave colorless needles, M.P. 62.0° C.

*Analysis.*—Calc'd for $C_4H_8ClNO_2$: C, 34.91; H, 5.86; Cl, 25.77; N, 10.18. Found: C, 35.78; H, 5.97; Cl, 26.16; N, 10.52.

Example II

The procedure described in Example I was followed employing butanediol-2,3 (180 parts), potassium cyanide (130 parts), sodium hydroxide (160 parts) and water (800 parts). Chlorination was carried out as described in Example I and there was obtained, after work-up, 82 parts of β-chloro-α-methyl-α-hydroxybutyramide (also referred to as 2-hydroxy-2-methyl-3-chlorobutyramide), B.P. 115–118° C. (1 mm.). Recrystallization of a sample from hexane afforded colorless needles, M.P. 109.0–109.4° C.

*Analysis.*—Calc'd for $C_5H_{10}ClNO_2$: C, 39.61; H, 6.65; Cl, 23.39; N, 9.24. Found: C, 40.72; H, 6.78; Cl, 23.12; N, 9.52.

The infrared spectrum of the product was in accord with the assigned structure.

Example III

The procedure of Example I was followed employing isopropanol (480 parts), potassium cyanide (130 parts), sodium hydroxide (160 parts) and water (1000 parts). Chlorination was carried out as described in Example I and there was obtained, after work-up, 86 parts of α-methyl-α-hydroxypropionamide (also referred to as 2-hydroxy-2-methylpropionamide), M.P. 95.0–95.5° C.

*Analysis.*—Calc'd for $C_4H_9NO_2$: C, 46.59; H, 8.80; N, 13.59. Found: C, 47.23; H, 9.56; N, 13.35.

The infrared spectrum was identical to that of α-methyl-α-hydroxypropionamide made by a prior known method.

Procedures for increasing the carbon content of organic molecules are much sought by organic chemists. Many known procedures, though highly important, are complicated, costly and in many cases hazardous to carry out. The process of this invention provides a simple means for accomplishing this increase in carbon content, and it does not require elaborate or special equipment. The chemical reactions of this process are effected under very mild conditions which avoids contamination of the products with impurities arising from side reactions.

As already indicated, the α-hydroxyamides are useful in the manufacture of pharmaceuticals and as softeners for regenerated cellulose. The β-halo-α-hydroxyamides, prepared by the process of this invention, are also valuable by virtue of the active halogen in the molecule. For example, the β-chloro-α-methyl-α-hydroxypropionamide of Example I can be converted, by means of sodium cyanide, to β-cyano-α-hydroxy-α-methyl propionamide which can be converted by dehydration and then hydrolysis to itaconic and citraconic acids

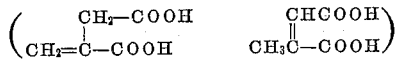

or the anhydrides thereof, all of which are valuable industrial chemicals.

What is claimed is:

1. A process for preparing α-hydroxyamides which comprises contacting a monomeric secondary alcohol of from 3–13 carbon atoms and having the formula

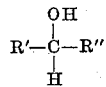

wherein R' and R'' are selected from the class consisting of alkyl and hydroxyalkyl radicals, with an alkali metal cyanide and a halogen of atomic number 17–35 in an aqueous alkaline medium.

2. The process of claim 1 wherein R' and R'' each contain from 1–6 carbon atoms.

3. The process of claim 1 wherein the halogen is chlorine.

4. The process of claim 1 wherein the alkali metal cyanide is potassium cyanide.

5. The process of claim 1 carried out at a temperature of between about −25° C. and 50° C.

6. A process for preparing α-methyl-α-hydroxypropionamide comprising contacting isopropanol with chlorine and potassium cyanide in aqueous sodium hydroxide at a temperature of from about −25° C. to 50° C.

7. A process for preparing β - chloro - α - methyl - α-hydroxypropionamide comprising contacting propanediol-1,2 with chlorine and potassium cyanide in aqueous sodium hydroxide at a temperature of between about −25° C. and 50° C.

8. A process for preparing β - chloro - α - methyl - α-hydroxybutyramide comprising contacting butanediol-2,3 with chlorine and potassium cyanide in aqueous sodium hydroxide at a temperature between about −25° C. and 50° C.

No references cited.